United States Patent [19]
Rolland et al.

[11] Patent Number: 5,799,119
[45] Date of Patent: Aug. 25, 1998

[54] COUPLING OF STRONGLY AND WEAKLY GUIDING WAVEGUIDES FOR COMPACT INTEGRATED MACH ZEHNDER MODULATORS

[75] Inventors: Claude Rolland, Ottawa; Jun Yu, Stittsville, both of Canada

[73] Assignee: Northern Telecom Limited, Montreal, Canada

[21] Appl. No.: 675,757

[22] Filed: Jul. 3, 1996

[51] Int. Cl.$^6$ .................................................. G02B 6/26
[52] U.S. Cl. ............................. 385/28; 385/14; 385/132; 385/43; 385/45
[58] Field of Search ................ 385/28, 29, 30, 385/39, 43, 129, 130, 131, 132, 14, 11, 45

[56] References Cited

U.S. PATENT DOCUMENTS

| | | | |
|---|---|---|---|
| 5,185,828 | 2/1993 | Van Der Tol | 385/28 |
| 5,285,507 | 2/1994 | Van der Tol | 385/4 |
| 5,325,221 | 6/1994 | Van Der Tol | 385/14 |
| 5,363,457 | 11/1994 | Falt et al. | 385/3 |
| 5,539,845 | 7/1996 | Van Der Tol | 385/28 |

FOREIGN PATENT DOCUMENTS 0 647 861 A1   8/1994   European Pat. Off.

OTHER PUBLICATIONS

"Optimization of Strongly Guiding Semiconductor Rib Waveguide Y-Junctions" C. Rolland, et al, IEEE Photonics Technology Letters, vol. 2, No. 6, pp. 402–406, Jun. 1990.

"Coherent Coupling of Radiation Modes in Mach–Zehnder Electrooptic Modulators" D.A.M. Khalil et al, IEEE Journal of Quantun Electronics vol. 28, No. 5, pp. 1236–1238, May 1992.

Chapter 5 of the Ph.D. Thesis of Jun Yu one of the present inventions, Queen's University, Kingston, Canada 1994.

"10Gbit/s, 1.56μm Multiquantum Well InP/InGaAsP Mach–Zehnder Optical Modulator" C. Rolland et al, Electronics Letters, vol. 29 pp. 471–472, 1993.

"Numerical Modeling of Coherent Coupling and Radiation Fields in Planar Y–Branch Interferometers" M. Munowitz et al, Journal of Lightwave Technology, vol. 10, No. 11, pp. 1570–1574, 1992.

*Primary Examiner*—John Ngo
*Attorney, Agent, or Firm*—Angela C. de Wilton

[57] ABSTRACT

A Mach Zehnder (MZ) modulator with improved coupling of input and output fibers is provided. The MZ modulator combines the advantages of weakly guided input sections with strongly guided sections to optimize the coupling efficiency and selectivity of the device. Improved coupling between weakly and strongly guided sections of waveguide is provided by an intermediate tapered waveguide section which provides gradually changing mode confinement, which reduces the mode mismatch loss and therefore suppresses the reflection at the junction between the weakly and strongly guided sections of the waveguide.

7 Claims, 8 Drawing Sheets

COUPLING OF STRONGLY AND WEAKLY GUIDING WAVEGUIDES FOR COMPACT INTEGRATED MACH ZEHNDER MODULATORS

FIELD OF INVENTION

This invention relates to optical coupling of a strongly guiding waveguide and a weakly guiding waveguide, and in particular relates to improvements in integrated Mach-Zehnder modulators.

BACKGROUND OF THE INVENTION

In high bit rate, long haul fiber optic communications, a longer repeater span can be achieved by selecting an operating wavelength to reduce fiber losses, and by reducing spectral broadening due to chirp or wavelength shift caused by high frequency modulation of a laser source.

Minimum absorption of conventional single mode fibers occurs at 1.55 μm, and minimum dispersion at 1.3 μm. Since absorption losses are a more significant limitation for long haul transmission, 1.55 μm laser sources are preferred. Nevertheless, chromatic dispersion of conventional single mode fibers is higher at 1.55 μm than at 1.3 μm and originates from a frequency dependent group velocity.

The direct modulation of lasers at high frequency usually results in a relatively large frequency chirp. Spectral broadening occurs in part due to a wavelength shift or chirp which causes pulse broadening from a wavelength shift to shorter wavelengths (blue shift) at the rising edge of a modulating pulse and a wavelength shift to longer wavelengths (red shift) at the falling edge of the pulse. The latter effect is known as positive frequency chirp. By using low chirp, multiple quantum well (MQW) lasers at 1.55 μm, 2.5 Gb/s transmission systems with a repeater span of 80 km are commercially available. However, the dispersion penalty of directly modulated lasers is too large for practical long haul transmission at 10 Gb/s.

An alternative approach is to use an electro-optical modulator in conjunction with a narrow band, continuous wave (cw) laser to provide a modulated signal with reduced or controllable chirp. In electro-optic modulators, the phase retardation produced by the modulation signal is usually transformed to intensity modulation by a Mach Zehnder interferometer or a directional coupler.

Mach Zehnder (MZ) modulators are of particular interest in this application. An integrated or semiconductor MZ modulator comprises an optical waveguide splitter coupled to first and second waveguide channels or arms which provide electro-optic modulator sections, and a waveguide combiner. Electrodes are associated with each of the waveguide arms and provide a modulation voltage to one or both electrodes, to change the index, and thereby the relative phases of the two light beams may be altered. Thus a differential phase change may result in both beams combining in phase to give a maximum intensity or "on" signal, whereas a λ/2 shift (or π shift) results in beam extinction or an "off" signal. Typically, the splitter and combiner take the form of a Y branch waveguide, i.e. a splitter or directional coupler, part of which may be referred to as an "S bend" in view of the typical S shape of the connecting portion of the waveguide.

Conventionally LiNbO$_3$ was used for these electro-optic modulators. More recently, multi-quantum well MQW III–V semiconductor modulators have been developed which are compact, have low drive power requirements and may be monolithically integrated with a laser source. In these MQW structures, excitons formed from an electron hole pair show sharp absorption peaks even at room temperature. When an electric field is applied perpendicularly to the plane of the layers forming the MQW structure, the energy gap is reduced and the exciton peaks shifts to longer wavelengths. This is called the Quantum Confined Stark effect (QCSE). By using the QCSE two kinds of external modulators can be fabricated. One is an electro-absorption modulator, the other is a phase modulator. For bulk semiconductor modulators the phase changes linearly with external field due to the Franz Keldysh effect. In MQW modulators, a quadratic term is added to the phase variation by the QCSE, so that relatively large field induced phase shifts can be obtained in compact and fast phase modulators.

The ability to control the chirp frequency by choosing the drive voltage or the power splitting ratio in the two arms means that MZ modulators are well suited for multi-gigabit long distance optical fiber transmission.

Various methods are known for reducing or controlling chip in optical modulators. For example, an improvement in Mach Zehnder type semiconductor modulators is described in copending U.S. patent application Ser. No. 08/188.000 filed 28 Jan., 1994 to Rolland et al., one of the present inventors, entitled "Chirp control of a Mach Zehnder optical modulator using non-equal power splitting". In the latter design, there is provided means to control the ratio of the optical power between the first and second arms of the modulator.

Another example of an improved Mach Zehnder type semiconductor modulator is described in copending G.B. patent application Ser. No. 9513146.2 filed 28 Jun., 1995 to Jun Yu et al., one of the present inventors, and entitled "Semiconductor modulator with a ½ shift" in which a modulator design has arms of unequal length, i.e. an asymmetric configuration, wherein the path length in the two arms differs by one half or an odd multiple of the wavelength of a III–V MQW device, resulting in negative chirp and high extinction ratio for an equal push-pull device configuration.

U.S. Pat. No. 5,363,456 entitled "Optical phase modulating devices and methods for their operation" to Falt et al., describes the use of first and second pairs of phase fixing electrodes bracketing a pair of phase modulating electrodes to improve frequency response.

Ideally these devices are single mode and have dimensions compatible with those of an optical fiber or laser source in order to increase coupling efficiency. The beam propagation method (BPM) has been used for simulation and design of MQW modulators, for example, as discussed by Rolland et al., in IEEE Photonics Technology Letters, Vol. 2, No. 6, June 1990, entitled "Optimization of Strongly Guiding Semiconductor Rib Waveguide Y-junctions", and by Khalil et al., in "Coherent Coupling of Radiation Modes in Mach-Zehnder Electrooptic Modulators", IEEE Journal of Quantum Electronics vol. 28, no. 5, May 1992. BPM is used to calculate the losses of the interferometer as a function of the length of the device. At the input and output of the device optical transitions are required into the guided wave structure which forms the modulator.

For a guided waveguide structure, any small axial variation in the structure results in a coupling of an amount of energy to the radiation modes. In Mach Zehnder modulators, for example, the radiation field can be excited by either mode mismatching or fiber misalignment.

Modulators made with strongly guided waveguide structures have the advantages of short device dimensions, low loss and greater overlapping between electrical and optical fields. Strongly guided structures are fabricated by etching right through the guiding layer or MQW layer in the ridge waveguide. The coupling loss is determined by the input source profile, e.g. field profile of the tapered fiber at the input, and the lateral structure of the waveguide. Although the coupling efficiency in general increases with the width of a ridge waveguide, BPM analysis showed that the width of the MQW must be limited to 2.1 µm to prevent the waveguide from becoming multimode (see Chapter 5 of the Ph.D. Thesis of Jun Yu one of the present inventors, Queen's University, Kingston, Canada, 1994).

On the other hand, any radiation field tends to be guided in strongly guided structure, and may interfere with the fundamental mode so that device performance is affected adversely. It takes a much longer distance for the radiation energy to leak out than in a weakly guided structure. The strongly guided structure advantageously uses a short S bend ~100 µm, and has large overlapping between the E/O modes. However the strongly guided structure is very sensitive to fiber coupling, i.e. misalignment, incident angle, etc., and there is less effective coupling between the waveguide and fiber compared with a weakly guided structure.

If the layers are etched only to just above the MQW, the structure of the waveguide becomes close to that of a rib waveguide, which is a weakly guided structure.

In a weakly guided structure, the extinction ratio and frequency chirp are virtually insensitive to submicron misalignment of the fiber output. The fabrication is more complex in that a special etch stop is required, and good control of the slope of ridge sidewalls near the bottom of the ridge is required for reliable single mode waveguides.

Radiation fields excited in weakly guided structures are expected to be less guided and therefore have less effects on the modulator characteristics. However, a much longer S bend portion is required to maintain the same aperture at the output without power penalty with respect to a strongly guided structure. (BPM analysis and measurements confirmed that a distance of from 0.1 µm and 0.2 µm between the top of the MQW and the etch stop provided a weakly guided structure). The S bend length was increased from 100 µm in the strongly guided section to ~700–1000 µm to provide low S bend loss.

In a strongly guiding structure, simulations suggest that the bit 0 output of the modulator should be near zero when the modulator is turned off. Experimentally, a significant amount of residual power is detected. The antisymmetric field of the bit 0 is a radiation mode in the single mode waveguide at the output section of the modulator, which propagates for a long distance due to the strongly guiding ridge waveguide.

SUMMARY OF THE INVENTION

Thus the present invention seeks to provide an improved optical coupling between weakly guiding and strongly guiding waveguides, such as used in an electro-optic modulator, and in particular the invention seeks to provide improved coupling for Mach Zehnder modulators to reduce the effects of fiber misalignment.

According to one aspect of the present invention there is provided an optical waveguide structure having a strongly guiding section, a weakly guiding section and an intermediate section disposed therebetween, the intermediate section providing gradually changing mode confinement between the weakly and strongly guided sections.

For example, a tapered waveguide section is used as a buffer between weak and strongly guided waveguide sections to reduce mode mismatch loss, and thereby suppress reflective losses. Thus in an integral waveguide, the advantages of both weakly and strongly guided sections are obtained with improved coupling efficiency.

The gradually changing mode confinement between the weakly and strongly guided sections may be provided by an intermediate section in which the width or depth of the waveguide is tapered, e.g. the width decreases between the weakly and strongly guided sections.

In a waveguide fabricated on a semiconductor substrate comprising a multilayer semiconductor structure including a guiding layer disposed between an underlying layer and an overlying layer, the waveguide is defined by a ridge structure etched into the multilayer semiconductor structure, the strongly guiding section being defined by the guiding layer in part of the ridge structure extending through the guiding layer to the underlying layer and the weakly guiding section is defined by part of the ridge structure which terminates in the overlying layer above the guiding layer. The intermediate tapered section coupling the strongly guiding section and the weakly guiding section is provided by a ridge structure having an upper portion of uniform width and a lower portion decreasing in width from the weakly guided to the strongly guided section, the lower portion of the ridge extending through the guiding layer.

The guiding layer may comprise at least one quantum well.

According to another aspect of the present invention there is provided a Mach Zehnder semiconductor modulator defined by a ridge waveguide structure formed on a semiconductor substrate, the modulator comprising an input waveguide splitter, outputs of the waveguide splitter coupled respectively to a pair of modulator portions having outputs coupled to a waveguide combiner, the input waveguide splitter and waveguide combiner are provided by strongly guiding waveguide portions, coupled to weakly guiding sections respectively of the input of the waveguide splitter and output of the waveguide combiner.

Butt coupling of the weakly and strongly guided section works in practice to reduce the effects of misalignment on coupling efficiency. However this structure may cause mode mismatch at the abrupt boundary between the weakly and strongly guiding sections and cause reflections which are detrimental for integrated laser and modulator design.

Beneficially, the weakly guiding section is coupled to the strongly guiding section through an intermediate tapered section, the intermediate tapered section providing gradually increasing mode confinement between the weakly guided and strongly guided sections.

Practically, the gradually increasing mode confinement of the tapered section is preferably provided by tapering the width of the intermediate section, i.e. providing an intermediate section of the waveguide that varies in a width from a first width adjacent the weakly guiding section to a narrower width adjacent the strongly guiding section.

The tapered section is effective in reducing losses, therefore suppressing reflection, and reducing mode mismatch losses. Experimental data from about 40 devices show about 0.59 dB increased transmission at each taper.

Alternatively, the gradually increasing mode confinement of the tapered section is provided by varying another parameter of the intermediate section of the waveguide, e.g. the depth.

Where the ridge waveguide structure is fabricated on a semiconductor substrate and comprises a multilayer semiconductor structure including a guiding layer disposed between an underlying layer and an overlying layer, each of the strongly guiding sections are defined by a part of the ridge structure extending through the guiding layer to the underlying layer, and each of the weakly guiding sections are defined by part of the ridge structure terminating in the overlying layer above the guiding layer. The intermediate tapered section extends between the weakly guiding section and the strongly guiding section. The tapered section has an upper portion having a uniform width and a lower portion decreasing in width from the weakly guided section to the weakly guided section.

As an example, the width of the intermediate section tapers from 6 μm to 2 μm over a 30 μm length and is produced with 0.1 μm writing resolution. The tapered section may be fabricated in a two step etch process, using a combination dry etching and wet etching steps. To assist in fabrication, a wet etch stop layer is placed 0.15±0.05 μm above the guiding layer.

These structures are well suited for operation with communications lasers operating at standard wave lengths.

Thus, a Mach Zehnder (MZ) modulator with improved coupling of input and output fibers is provided. The MZ modulator combines the advantages of weakly guided input sections with strongly guided sections to optimize the coupling efficiency and selectivity of the device.

Improved coupling between weakly and strongly guided sections of waveguide is provided by an intermediate tapered waveguide section which provides gradually changing mode confinement, which reduces the mode mismatch loss and therefore suppresses reflections at the junction between the weakly and strongly guided sections of the waveguide.

BRIEF DESCRIPTION THE DRAWINGS

Embodiments of the invention will now be described by way of example, with reference to the accompanying drawings, in which.

DESCRIPTION OF THE PREFERRED EMBODIMENTS

Figures 1, 2:
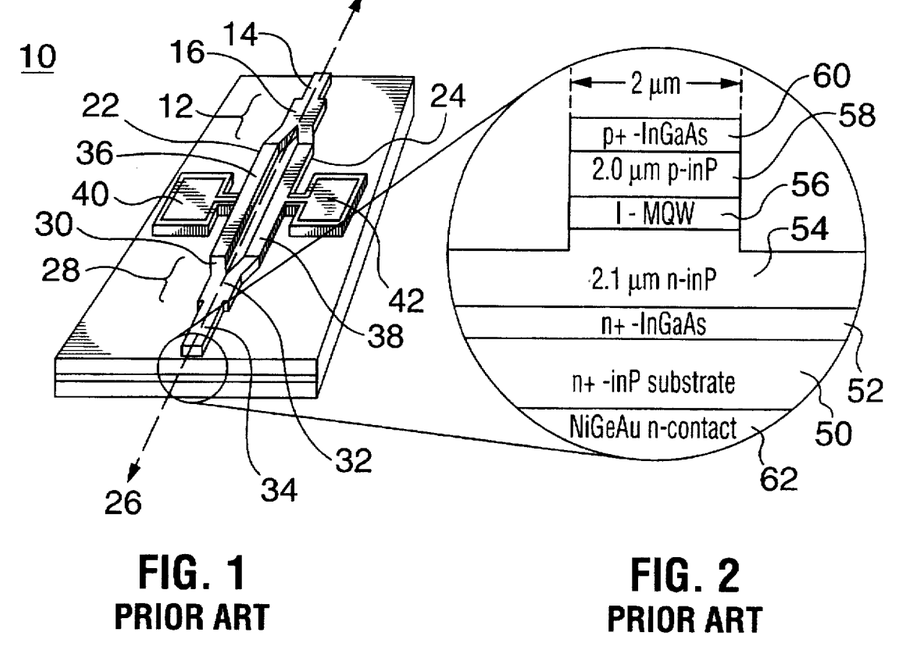
FIG. 1 shows a schematic diagram of a conventional known MQW semiconductor Mach Zehnder (MZ) modulator.
FIG. 2 shows an enlarged schematic cross-sectional diagram through part of the known MQW semiconductor MZ modulator of FIG. 1.

A schematic diagram of a known prior art semiconductor Mach-Zehnder modulator comprising a multi-quantum well structure is shown in FIGS. 1. The modulator 10 comprises an input Y junction 12 having an input waveguide 14 to which light from an appropriate laser source is directed. Input waveguide 14 is approximately 2 μm wide, and is single mode. The input optical power from a laser is supplied to the waveguide 14 though means of a fiber pigtail (not shown) or alternatively, the laser is integrated monolithically on a common substrate. The input Y branch (splitter) 12, comprises a single mode waveguide section 14 followed by a ridge triple mode section 16, which is ~40 μm long and ~4 μm wide, and two S bend sections 20, which are about ~100 μm long. Section 16 supports 3 modes, two symmetric modes and one antisymmetric mode. Branch arms 22 and 24 of the modulator are coupled to and centered on two S bend curve portions 20, and are each approximately 2 μm wide in order to support only a single mode. Typically, known modulators are designed such that branch arms 22 and 24 are equally spaced on either side of the longitudinal axis 26. Branch arms 22 and 24 are separated by ~20 μm. The output Y branch (combiner) 28 has similar dimensions to the input Y branch, comprising two S bend portions 30 which recombine light into a triple mode waveguide portion 32 coupled to a single mode waveguide portion 34, similar to the input Y junction. A top view of part of the modulator showing the input Y branch 12 is shown on enlarged scale in FIG. 3.

Each arm 22 and 24 has an overlying metallization layer 36 and 38 respectively which terminates at electrode pads 40 and 42 respectively. These electrodes provide for independently supplying a voltage to each waveguide arm, 22 and 24, in order to change the refractive index which in turn modifies the phase of the light propagating through the waveguide. These single mode waveguide sections 22 and 24 are nominally 2 μm wide and 3 μm deep, and for example, about 600 μm long and separated by approximately 20 μm.

The enlarged insert in FIG. 2 shows a cross-sectional diagram through part of the input waveguide of FIG. 1 to show the layer structure of the waveguide, which is a typical strongly guiding structure. The layers comprises materials having non-linear electro-optic characteristics. III—V alloys InGaAsP/InP or AlGaAs/GaAs, as well as certain II—VI alloys, are examples. This type of layer structure is grown by known epitaxial methods such as metal organic chemical vapour deposition (MOCVD) or molecular beam epitaxy (MBE). As shown in the enlarged cross-sectional diagram of FIG. 2, the structure comprises a N+ InP substrate 50 on which is grown a thin InGaAs absorbing layer 52. An n-type InP cladding layer 54 is grown thereon followed by multi-quantum well (MQW) structure 56 which forms the guiding layer. The MQW structure 56 may be an intrinsic region comprising a plurality of quaternary InGaAsP layers separated by InP barrier layers. Typically, a MQW well is preferred, but alternatively a single quantum well may be used. A p-type InP cladding layer 58 is grown on top of the MQW 56, and finally a heavily doped $p^+$ InGaAs layer 60 serves as a contact enhancement layer and provides an absorbing layer. P-type contacts are selectively formed on top of layer 60 and n-type contacts 62 is formed to the substrate.

Figure 3:
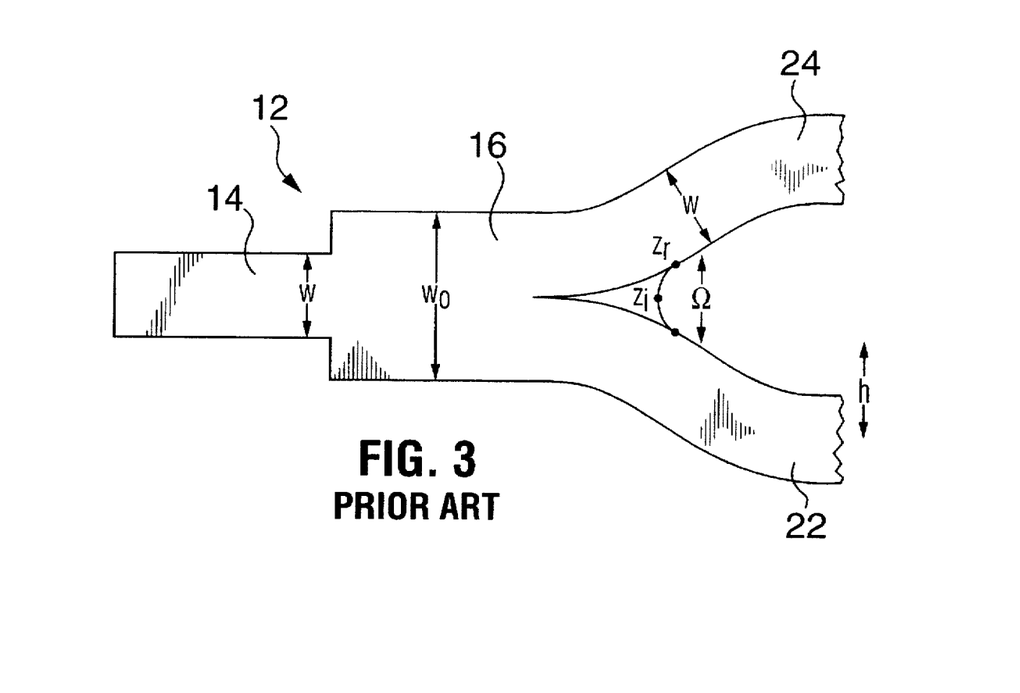
FIG. 3 shows a top view of part of the known MZ modulator of FIG. 1.

The layer structure of strongly guiding waveguide which forms the modulator shown in FIGS. 1 to 3 is the same throughout the modulator structure. In fabrication of the conventional structure shown in FIGS. 1 and 2, the device is patterned and bonding pads, wells and waveguide ridges or arms are simultaneously etched through the MQW layer as shown. As is shown in FIG. 2, the ridge sidewalls are etched into the substrate below the level of the MQW to provide a strongly guided structure. For example, a structure is described in more detail by Rolland et al. in an article entitled "10 Gbit/s 1.56 μm multiquantum well InP/InGaAs Mach Zehnder Optical Modulator", in Electronics Letters, Vol. 29 pp. 471–472, 1993. However, as mentioned above, although a strongly guided waveguide provides for a much more compact, shorter length structure, the strongly guiding waveguide is much more sensitive to fiber coupling, i.e. misalignment, incident angle, etc. and there is less effective coupling between the waveguide and fiber compared with a weakly guided structure.

Figure 4:
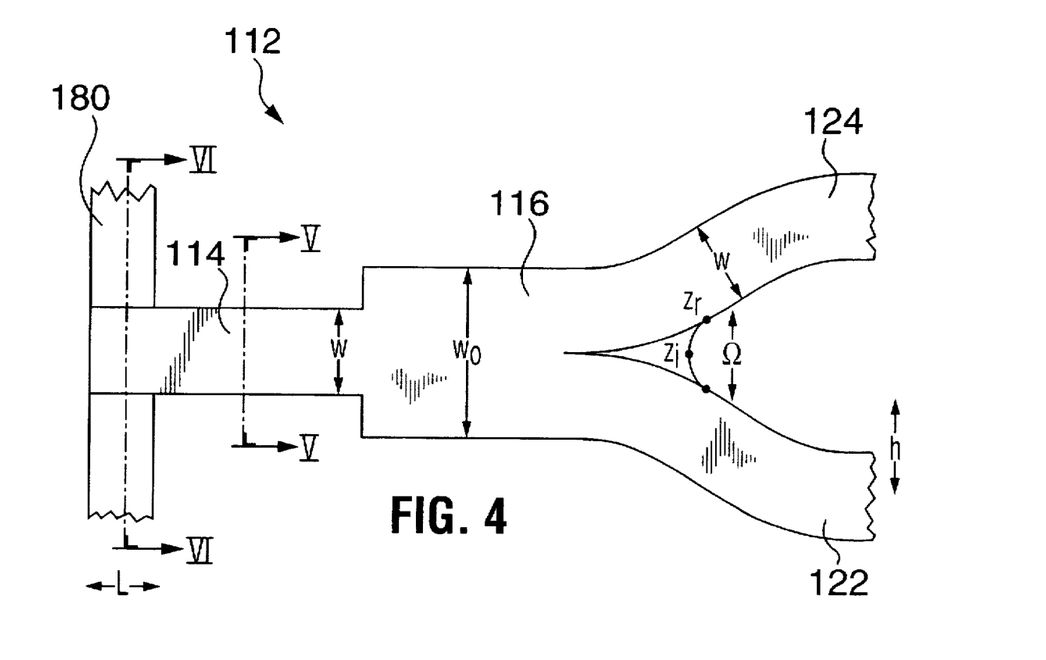
FIG. 4 shows a top view of part of the MZ modulator according to a first embodiment of the present invention.
Figure 5:
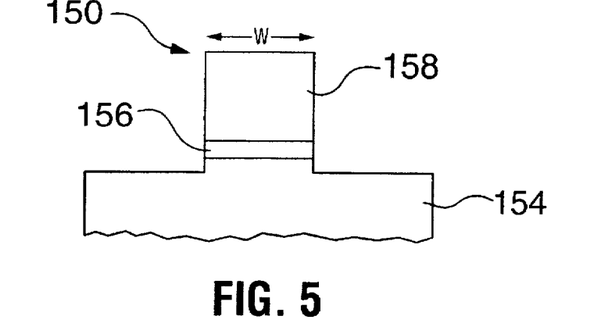
FIG. 5 shows a simplified cross-sectional diagram through V—V of FIG. 4, representing a section of strongly guiding waveguide.
Figure 5A:
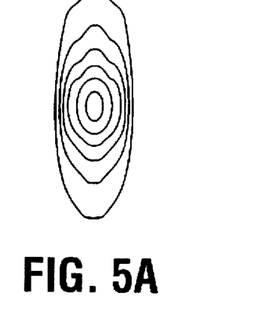
Figures 6, 6A, 7:
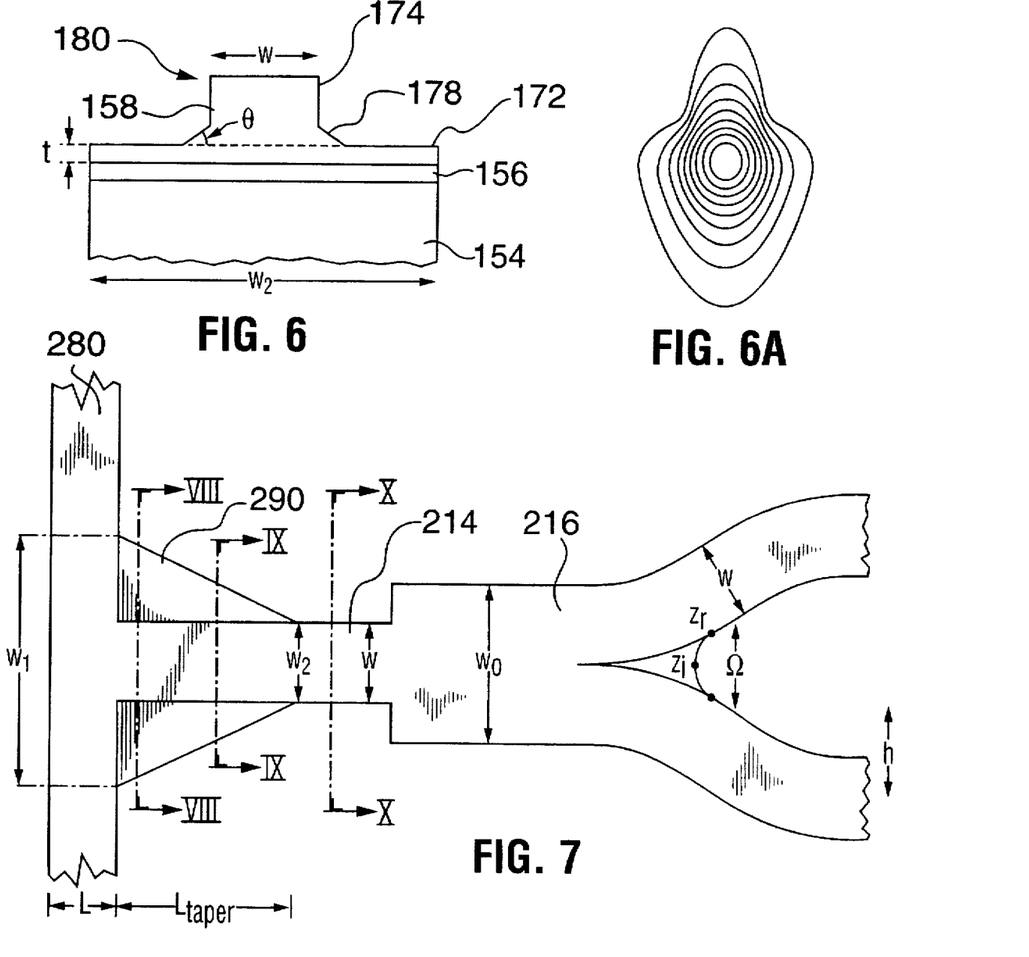
FIG. 6 shows a simplified cross-sectional diagram through VI—VI of FIG. 4, representing a section of weakly guiding waveguide.
FIG. 7 shows a top view of part of a MZ modulator according to the second embodiment of the present invention.

Part of a Mach Zehnder modulator according to a first embodiment of the present invention is shown schematically in FIGS. 4, 5 and 6 which shows respectively a top plan view of the input coupler section of the modulator, and cross-sectional views through sections V. and VI as indicated in FIG. 4. FIGS. 5A and 6A show the corresponding BPM propagation simulation for the beam profile in sections V and VI.

The structure of the modulator of the first embodiment comprises the main portions of the two Y branches forming the input splitter 112 (shown in FIG. 4) and output combiner, and branch arms 118 and 120 of the modulator, which are similar to the corresponding parts 16, 18 and 20 of the prior art modulator shown in FIG. 1. All these waveguide sections are fabricated as strongly guiding ridge waveguides, in which the ridge is etched through the guiding layer in a conventional manner as shown in FIG. 5.

The input and output coupler sections of MZ modulator of the first embodiment shown in FIG. 4 differs from a conventional MZ modulator of FIG. 3. The output section is similar to the input section shown in FIG. 4, and each comprise a weakly guiding waveguide section 180 which is butt coupled to the strongly guiding input section 116 of the modulator. A corresponding weakly guiding section is butt coupled to the output section (not shown).

The layer structure of the MZ modulator of the first embodiment is fabricated on a semiconductor substrate and comprises a multilayer structure illustrated in a simplified cross-sectional diagram through sections V—V and VI—VI of the structure of FIG. 4. The layers shown in FIG. 5 and 6 comprise a guiding layer 156 comprising a multi-quantum well structure disposed between an underlying n type layer 154 and an overlying p type layer 158, as is conventional. These compositions of these layers is similar to the multilayer structure of the prior art modulator shown in FIG. 2.

In cross-section, the weakly guiding input section 180 is as shown schematically in FIG. 6 and comprises a portion of the waveguide in which the ridge is defined in the overlying layer 158 down to an etch stop layer 172, a predetermined thickness t above the guiding layer 154. In fabrication of a ridge waveguide structure, a combination of dry etching and wet etching processes are typically used, and an etch stop layer is place just above the MQW layers as noted above to form weakly guiding sections. While the ideal profile is a straight vertical wall, structure is typically formed by a two step etching process comprising a anisotropic dry etch process and wet etch step. The dry etch step etches anisotropically and forms a ridge having steep sidewalls. In practice, the wet etch step down to the etch stop layer is required to control the etch depth, and results in a sloped sidewall of the ridge near the bottom of the ridge sidewall, i.e. "tails" in the structure where an angle q is dependent on the etch process (FIG. 6). Other modes will be excited depending on the dimensions of the structure. Nevertheless the effects of fiber misalignment are much reduced in the weakly guiding section even when the etch results in the structure shown in FIG. 6.

Theoretical mode structures in each section is characterized as shown in FIG. 5A and 6A. Thus an input from a laser source, which is either coupled directly, or coupled via an optical fiber, is more efficiently coupled to a weakly guiding input section.

Figure 11:
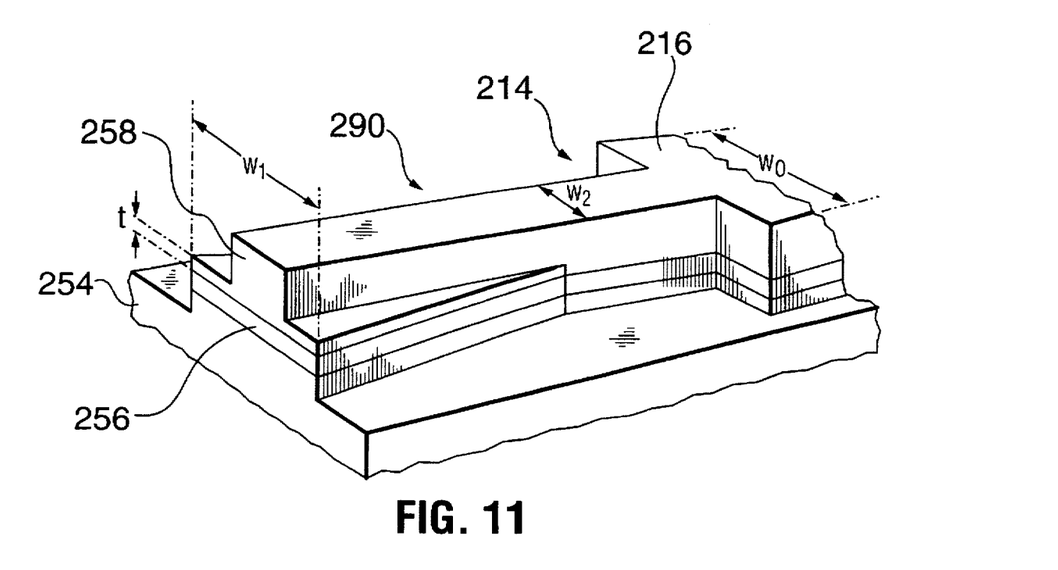
FIG. 11 shows a perspective view of part of the structure of the MZ modulator of FIG. 7 showing the intermediate tapered portion coupled to the strongly guiding portion of the input coupler section of the modulator.

The coupling loss between butt coupled sections of the weakly guiding waveguide section 180 and strongly guiding waveguide section 115 in the MZ modulator according to the first embodiment as a function of the thickness t of the layer between the etch stop layer and the top of the guiding layer are shown in FIG. 11. By changing the thickness t, the mode structure is changed to change the mode confinement, and improve coupling with the strongly guiding section of waveguide. The width of the ridge is w, and the width of the weakly guiding section 160 is $w_2$ as indicated in FIGS. 5 and 6. A preferred thickness t was between 0.1μ and 0.2 μm of the weakly guided section to reduce coupling loss for the butt coupled weak/strong sections input coupler section. The length of the weakly coupled section is preferably $\geq 150$ μm.

Figure 13:
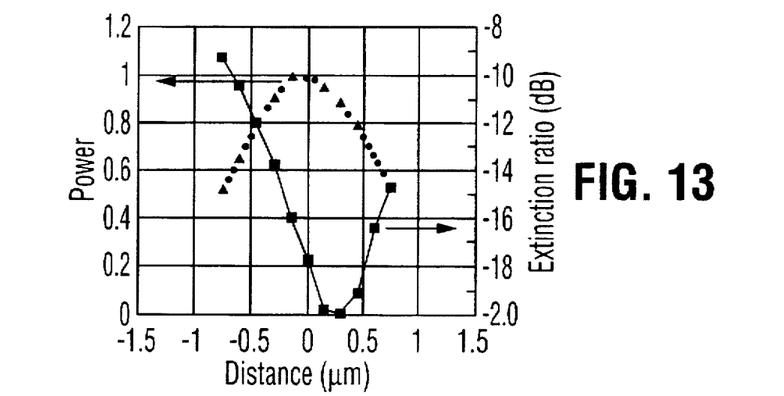
FIG. 13 shows the input power relative to the input fiber position and the extinction ratio relative to the output fiber position for a MZ modulator of the first embodiment fabricated with butt coupled sections of weakly guiding waveguide and strongly guiding waveguide.
Figure 14:
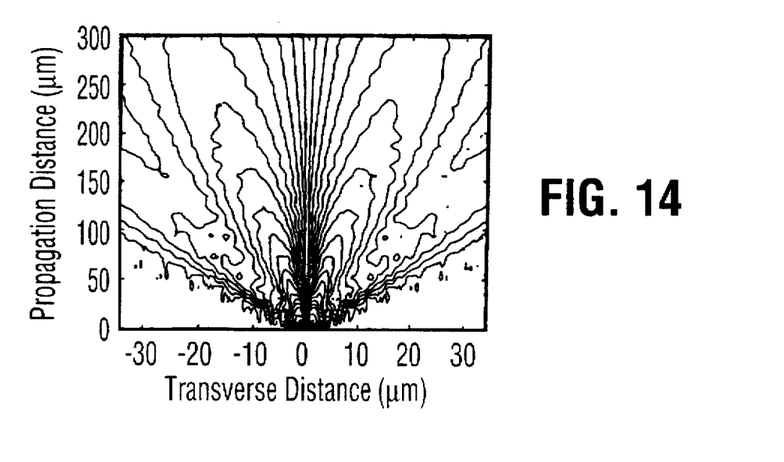
FIG. 14 shows the simulated mode propagating in the "off" state, in the weakly guiding output section of the waveguide of the first embodiment.
Figure 15:
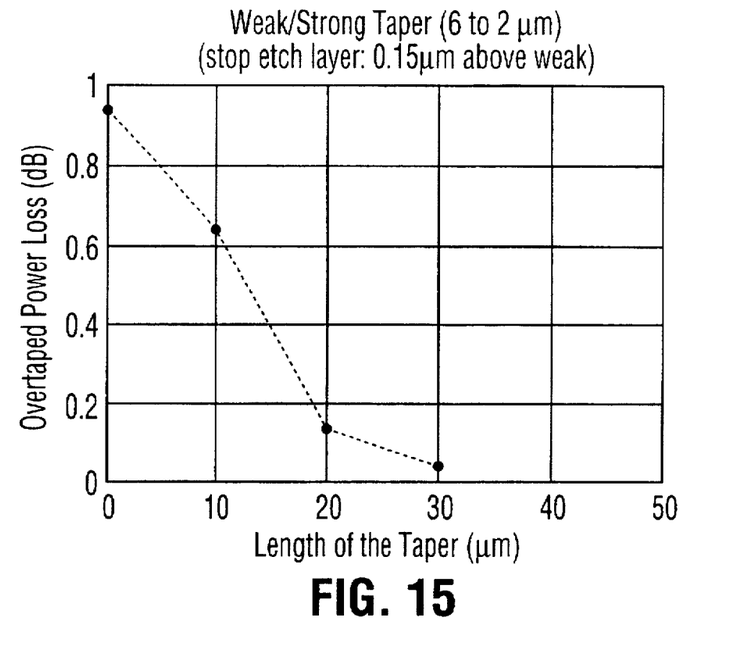
FIG. 15 shows the overlapped power loss as a function of the length of the taper in the modulator of the second embodiment having an intermediate section with a taper width from 6 μm to 2 μm.
Figure 16:
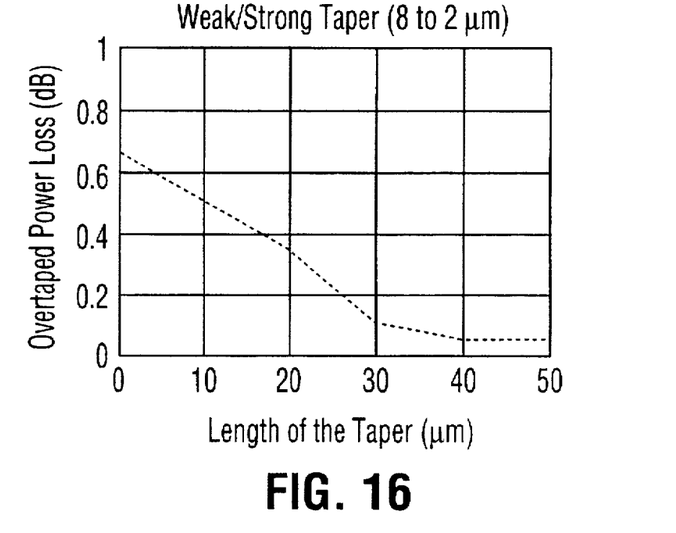
FIG. 16 shows overlapped power loss as a function of the length of the taper for a modulator of a second embodiment having an intermediate section with a taper width from 8 μm to 2 μm.

The coupled input power relative to the input fiber position (i.e. misalignment) and the extinction ratio relative to the output fiber position for a MZ modulator of the first embodiment fabricated with butt coupled sections of weakly guiding waveguide and strongly guiding waveguide are shown in FIG. 13. FIG. 14 shows the simulated mode propagating in the "off" state, in the weakly guiding output section of the waveguide of the first embodiment.

In a MZ modulator of a second embodiment the structure of the modulator is similar to that of the first embodiment except that as shown in FIG. 7, the input coupler comprises a weakly guiding waveguide input section 280, and a strongly guiding waveguide section 214 coupled by an intermediate section 290, which provides for gradually changing mode confinement between the weakly guiding and strongly guiding section. The corresponding elements of the structure of the second embodiment are referred to by the same reference numerals as those of the second embodiment incremented by 100.

Figures 8, 9:
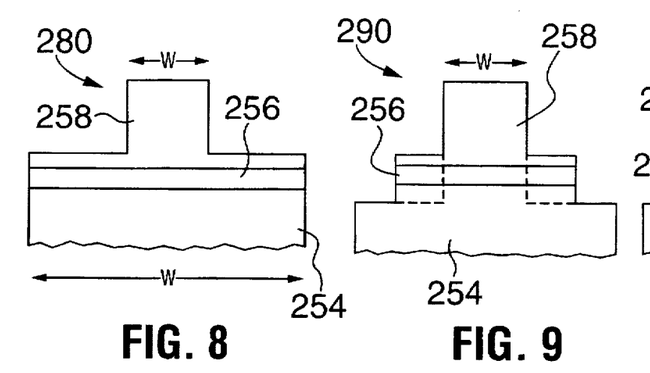
FIG. 8 shows a first-cross sectional view through section VIII—VIII of the structure shown in FIG. 7.
FIG. 9 shows a first cross-sectional view through section IX—IX of the structure shown in FIG. 6.
Figure 8A:
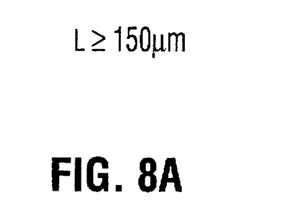
Figure 9A:
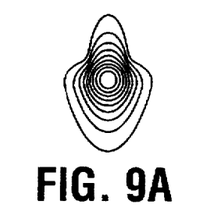
FIG. 9A shows the optical mode structure launching into this section of the waveguide.
Figure 10:
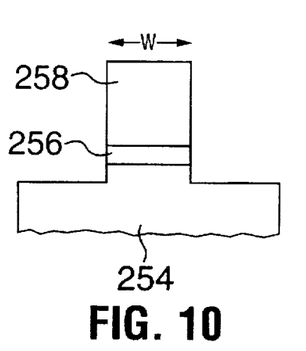
FIG. 10 shows a first cross-sectional view through section X—X of the structure shown in FIG. 6.
Figure 10A:
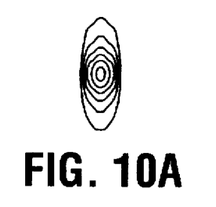
FIG. 10A shows the optical field structure at the end of the tapered section of the waveguide, which matches well with the mode in the strongly guiding section of the waveguide.

The structure of the intermediate section 290 provides a transition between the weakly guided and strongly guided waveguide portions as shown in FIG. 11 which is a perspective view of part of the input coupler. As FIG. 11 shows, the intermediate section 290 is characterized by a tapered width, which defines the width of the guiding layer in the waveguide, as shown in FIG. 7 and cross-sectional schematics in FIGS. 8, 9 and 10. The change in mode confinement as the width narrows through the taper in the width of the intermediate section causes squeezing of the mode to reduce mode mismatch in coupling of the weakly guiding waveguide section 280 and the strongly guiding waveguide section 214. The intermediate tapered portion is characterized by a upper portion defining a ridge of uniform width w and a lower portion defined through the guiding layer in which the width of the waveguide is tapered from a first width $w_1$ adjacent the weakly guiding section to a narrower width $w_2$ adjacent the strongly guided portion, as shown in FIG. 8, 9 and 10 respectively. The tapered portion 290 therefore provides a transition region between the weakly guided and strongly guided waveguide portions as shown in FIG. 11.

The tapered section improves coupling efficiency between the weakly guiding waveguide section a strongly guiding waveguide sections of the modulator, by providing changing mode confinement along the length of the tapered section.

Practically, the gradually increasing mode confinement of the tapered section is preferably provided by tapering the width of the intermediate section, i.e. providing an intermediate section of the waveguide that varies in a width from a first width adjacent the weakly guiding section to a narrower width adjacent the strongly guiding section.

The tapered section is effective in reducing losses, therefore suppressing reflection, and reducing mode mismatch losses. Experimental data from about 40 devices show about 0.59 dB increased transmission at each taper. A theoretical increase in transmission of 1 dB was calculated.

Figure 12:
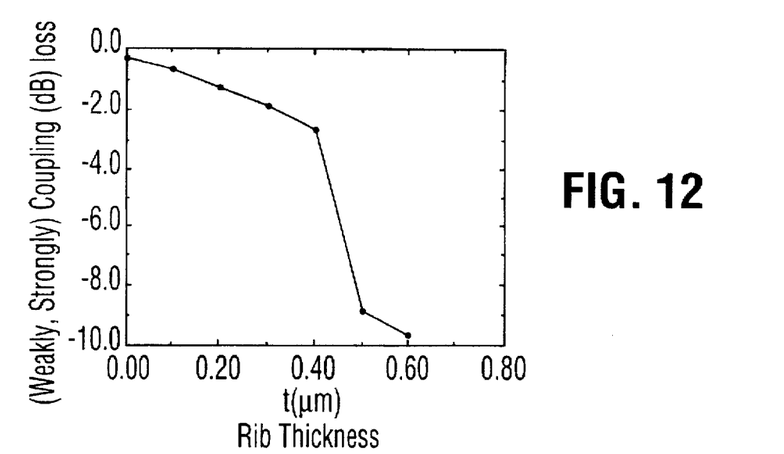
FIG. 12 shows the coupling loss as a function of rib thickness between the etching stop layer and the top of the guiding layer for butt coupled sections of weakly guiding waveguide and strongly guiding waveguide to illustrate mode mismatching in the modulator of the first embodiment.

The data shown in FIGS. 12 and 13 provide the results of simulations by BPM and measurement on the MZ modulator structure of the second embodiment to demonstrate the improvements provided by the weakly guiding sections of the waveguide structure at both ends of the modulator. In particular, FIG. 12 shows the power loss for a width taper from 6 µm to 2 µm as a function of taper length $L_{taper}$ of 30 µm and FIG. 13 shows similar results for a width taper from 8 µm to 2 µm as a function of taper length $L_{taper}$.

Figure 17:
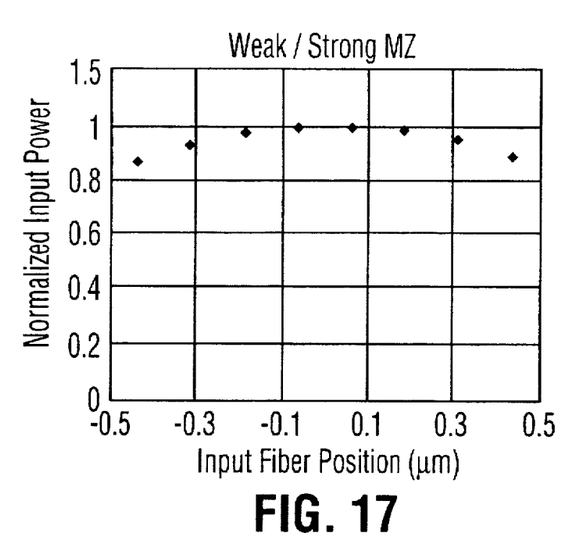
FIG. 17 shows the input power relative to the input fiber position for a MZ modulator according to the second embodiment.
Figure 18:
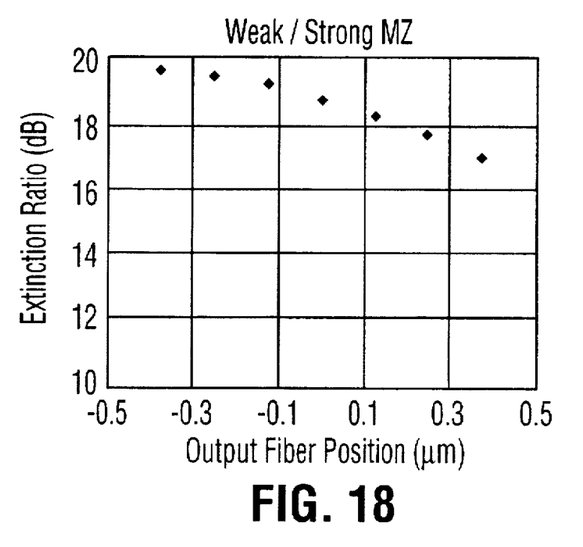
FIG. 18 shows the extinction ratio relative to the output fiber position for a MZ modulator according to the second embodiment.

The length of the weakly guiding input section is ≦150 µm. The overlapped power loss as a function of the length of the taper in the modulator of the second embodiment having an intermediate section with a taper width from 6 µm to 2 µm is shown in FIG. 12 and the overlapped power loss as a function of the length of the taper for another modulator of the second embodiment with different dimensions, i.e. having an intermediate section with a taper width from 8 µm to 2 µm is shown in FIG. 14. The input power relative to the input fiber position for a MZ modulator according to the second embodiment is shown in FIG. 17 and FIG. 18 shows the extinction ratio relative to the output fiber position for a MZ modulator according to the second embodiment.

Extinction ratio and frequency chirp are dependent on the output fiber misalignment. In conventional MZ modulators, the extinction ratio can change by several dB for a submicron misalignment of the output fiber. Frequency chirp is sensitive to output fiber misalignment, and there is a trade-off between extinction ratio and negative chirp for known modulator modes. In operation of the MZ modulator of the second embodiment, input fiber misalignment of 0.4 µm results in radiation field that quickly escape with almost no observable beating after a propagation distance of 150 µm. The power splitting ratio is also less sensitive to input fiber misalignment and the length of the input waveguide.

In comparison with the MZ modulator structure of the second embodiment, simulations and measurement were compared with results for a conventional MZ modulator made with all weakly guiding sections. In the latter, periodic exchange of power between guided and radiation modes was observed. The typical beating lengths were nearly 1mm for the weakly guiding MZ waveguides. On the other hand, a weakly guided structure advantageously provided improved coupling between waveguide and fiber, which is less sensitive to fiber coupling, misalignment or incident angle. Nevertheless, the structure requires a very long S bend e.g. 1000 µm, compared with ~100 µm in a strongly guided structure, and results in smaller overlapping between E/O modes.

In another conventional structure fabricated with all strongly guided sections, the beating length was observed to be about 20 µm, indicating more pronounced radiation field interference. Symmetric modes contribute equally to the two arms of the Y branch. However, an antisymmetric radiation field can be excited if the input fiber is misaligned. Some degree of misalignment is unavoidable in practice, especially during device packaging. The power splitting ratio between the two branches of the first Y junction influences the extinction ratio and the frequency chirp. For example, some known designs mentioned above, deliberately split the power ratio. However, fiber misalignment also excited antisymmetric modes which are not fully dissipated and thus contributed to the output, causing interference along the arms.

In fabrication of the MZ modulator structure of the second embodiment, for example, the width of the intermediate section tapered from a width $w_1$ of 6 µm to $w_2$ of 2 µm over a taper length of 30 µm and is produced with 0.1 µm writing resolution. The device structure may be fabricated in a three-step etch process, using a combination dry etching and wet etching steps. To assist in fabrication, a wet etch stop layer is placed 0.15±0.05 µm above the guiding layer. Thus the thickness t (see FIG. 3) of the ridge above the guiding layer is from 0.1 to 0.2 µm thick. Other samples tested tapered from a width $w_1$ of 8 µm to $w_2$ of 2 µm over 30 µm.

The three-step etch process requires two masking layers to define the intermediate section comprising the uniform width ridge and the tapered section where the width varies along the length of the tapered section. A first masking layer, typically SiO$_2$, defines the uniform width ridge of the weakly guided section and the strongly guiding sections of the waveguide. Then a second masking layer of SiNx defines the tapered region. The unmasked regions are then etched partially e.g. about 0.5 µm. The SiN$_x$ layer is removed and a second dry etch using the SiO$_2$ masking layer defines the ridge overlying the tapered lower portion of the intermediate section and completes etching of the strongly guiding sections of the waveguide. In the tapered region etching proceeds down to near the etch stop layer, and is completed by a wet etch to the etch stop to define the ridge overlying the tapered lower portion and other weakly guiding sections. To obtain reliable devices, careful alignment of two masks along the length of the ridge and the axis of the tapered portion is required. In developing prototypes, using contact masks, where alignment mask resolution is about 0.1 µm, an offset masking approach, while reducing total yield, can be used to ensure that in a proportion of the devices, the centre of the taper is accurately aligned along the axis of the waveguide. Alternative known masking schemes and etching processes may be used to improve alignment and increase yield of the devices.

Figure 19:
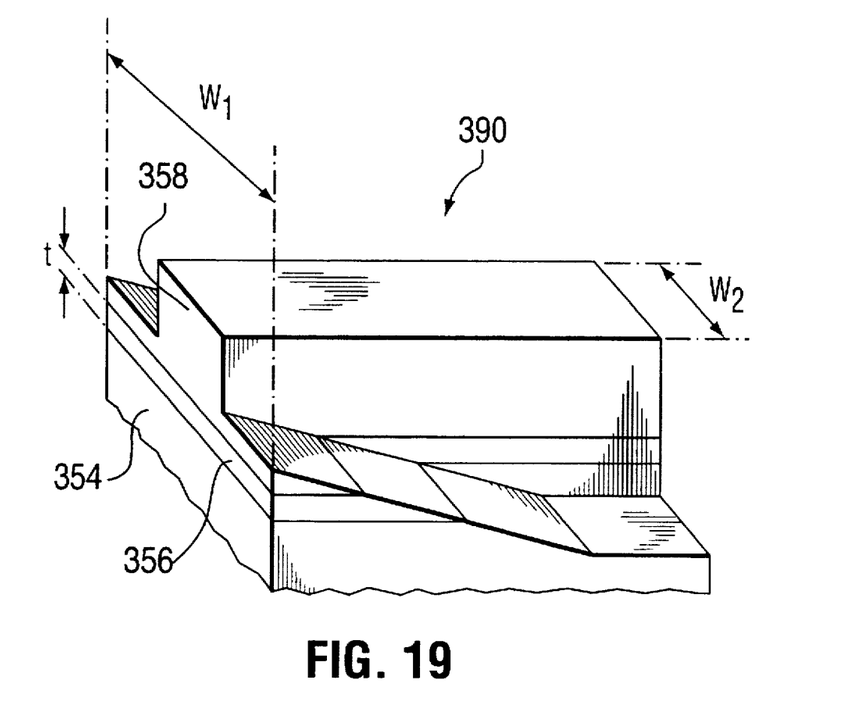
FIG. 19 shows a perspective view of part of the structure of an MZ modulator according to another embodiment showing the intermediate tapered portion coupled to the strongly guiding portion of the input coupler section of the modulator.

In an MZ modulator of another embodiment FIG. 19, comprising a tapered intermediate section provided in an alternative structure the changing mode confinement in the intermediate section is obtained by the depth of the waveguide, which is varied over the length of the tapered section. This structure requires selective epitaxial growth for fabrication, which is complex to control. In practice the structure of the second embodiment is preferred because tapering of the width is more readily achieved.

Thus an integral waveguide structure is provided having a weakly guiding waveguide section and a strongly guiding waveguide section coupled by an intermediate section which provides gradually changing mode confinement between the weakly and strongly guiding sections. The intermediate section is advantageously fabricated by tapering the lateral dimensions or other parameters of the waveguide structure, e.g. the width of part of the intermediate section of the waveguide comprising the guiding layer. Thus the change in mode structure results in a greater proportion of the power being matched into the strongly guiding section by squeezing the field, reducing mode mismatch and reflective losses.

What is claimed is:

1. An optical waveguide structure having a strong guiding section and a weakly guiding section coupled by an intermediate section, the intermediate section having a tapered structure to provide gradually changing mode confinement between the weakly guiding section and strongly guiding section and improve coupling efficiency between the weakly and strongly guiding sections.

2. An optical waveguide structure having a strongly guiding section and a weakly guiding section coupled by an intermediate section, the intermediate section to provide gradually changing mode confinement between the weakly and strongly guided sections, the waveguide structure being fabricated on a semiconductor substrate comprising a multilayer semiconductor structure including a guiding layer disposed between an underlying layer and an overlying layer, the waveguide being defined by a ridge structure etched into the multilayer semiconductor structure, the strongly guiding section being defined by part of the ridge structure extending through the guiding layer to the underlying layer;

the weakly guiding section being defined by part of the ridge structure which terminates in the overlying layer above the guiding layer; and the intermediate tapered section coupling the strongly guiding section and the weakly guiding section being provided by a ridge structure having an upper of uniform width and a lower tapered portion decreasing in width from the weakly guided to the strongly guided section, the lower tapered portion of the ridge extending through the guiding layer.

3. An optical waveguide according to claim 2 wherein the guiding layer comprises at least one quantum well.

4. An optical waveguide structure fabricated on a semiconductor substrate comprising a guiding layer, the waveguide structure comprising a first section and a second section coupled by an intermediate section, the first section having a weakly guiding waveguide structure, and the second section having a strongly guiding waveguide structure defined through the guiding layer, the intermediate section comprising a tapered waveguide structure for providing gradually changing mode confinement between the first and second sections.

5. An optical waveguide structure fabricated on a semiconductor substrate comprising a guiding layer, the waveguide structure comprising a first section and a second section coupled by an intermediate section, the first section having a weakly guiding rib waveguide structure, and the second section having a strongly guiding rib waveguide structure defined through the guiding layer, the intermediate section comprising a tapered rib waveguide structure for providing gradually changing mode confinement between the first and second sections.

6. An optical waveguide structure according to claim 5, wherein the tapered waveguide structure of the intermediate section has a first width adjacent the weakly guiding first section and tapers to a narrower width adjacent the strongly guiding second section.

7. An optical waveguide structure according to claim 5 wherein the tapered waveguide structure of the intermediate section has a first depth adjacent the weakly guiding first section and tapers to a second, greater, depth adjacent the strongly guiding second section.

* * * * *